United States Patent
Brückner

(10) Patent No.: US 11,052,873 B2
(45) Date of Patent: Jul. 6, 2021

(54) METHOD FOR OPERATING AN ANTI-THEFT APPARATUS OF A MOTOR VEHICLE, AND A MOTOR VEHICLE HAVING A MOBILE TERMINAL AS THE VEHICLE KEY

(71) Applicant: Volkswagen Aktiengesellschaft, Wolfsburg (DE)

(72) Inventor: Claus-Peter Brückner, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/686,584

(22) PCT Filed: May 24, 2018

(86) PCT No.: PCT/EP2018/063596
§ 371 (c)(1),
(2) Date: Nov. 18, 2019

(87) PCT Pub. No.: WO2018/233975
PCT Pub. Date: Dec. 27, 2018

(65) Prior Publication Data
US 2020/0122685 A1    Apr. 23, 2020

(30) Foreign Application Priority Data

Jun. 22, 2017   (DE) .................... 10 2017 210 568.2

(51) Int. Cl.
*B60R 25/24* (2013.01)
*E05B 73/00* (2006.01)
*G07C 9/00* (2020.01)

(52) U.S. Cl.
CPC ........ *B60R 25/245* (2013.01); *E05B 73/0005* (2013.01); *G07C 9/00309* (2013.01);
(Continued)

(58) Field of Classification Search
None
See application file for complete search history.

(56) References Cited

U.S. PATENT DOCUMENTS 6,998,957 B2   2/2006  Shibata et al. ............... 340/5.28
8,884,738 B2  11/2014  Spangenberg et al. ........ 340/5.2
(Continued)

FOREIGN PATENT DOCUMENTS

DE   102014015718 A1   4/1916  ............... B60R 1/02
DE   102016106057 A1  10/1916  ............. B60R 25/00
(Continued)

OTHER PUBLICATIONS

German Office Action, Application No. 102017210568.2, 7 pages, dated Dec. 15, 2017.
(Continued)

*Primary Examiner* — Carlos Garcia
(74) *Attorney, Agent, or Firm* — Slayden Grubert Beard PLLC

(57) ABSTRACT

The invention relates to a method for operating an anti-theft system of a motor vehicle, comprising a communication system for near field communication and a storage device within a transmission and reception zone of the communication system. The mobile terminal is deposited in a control area in the interior compartment of the motor vehicle, the control area being located outside the transmission and reception zone. The deposited mobile terminal is connected to the communication system by a connecting device, which may, e.g., take the form of a cable, and a wired data communication connection is established. A control unit
(Continued)

detects whether the data communication connection has been established with the mobile terminal by the connecting device and detects whether the mobile terminal is authorised to operate the anti-theft system, and depending on whether the authorisation has been detected, activates and/or deactivates a function of the anti-theft system.

18 Claims, 1 Drawing Sheet

(52) U.S. Cl.
CPC ... *B60R 2325/103* (2013.01); *B60R 2325/205* (2013.01); *G07C 2209/64* (2013.01)

(56) References Cited

U.S. PATENT DOCUMENTS

| | | |
|---|---|---|
| 9,110,772 B2 | 8/2015 | Huntzicker et al. |
| 9,134,956 B2 | 9/2015 | Yamashita et al. |
| 9,838,529 B2 | 12/2017 | Bräutigam et al. |
| 10,249,123 B2 | 4/2019 | Hatton et al. |
| 2010/0265032 A1 | 10/2010 | Nonaka ............ 340/5.61 |
| 2013/0183957 A1 | 7/2013 | Iwasaki ............ 455/420 |
| 2013/0258604 A1* | 10/2013 | Quijano ............ B60R 7/04 361/725 |

FOREIGN PATENT DOCUMENTS

| | | | |
|---|---|---|---|
| DE | 102013222332 B4 | 11/1916 | ............ B60R 16/02 |
| DE | 102017210568 A1 | 12/1918 | ............ B60R 25/00 |
| DE | 60225772 T2 | 5/2009 | ............ B60R 25/04 |
| DE | 102010015390 A1 | 11/2010 | ............ B60R 25/01 |
| DE | 102011011697 A1 | 12/2011 | ............ B60R 16/02 |
| DE | 102013221116 A1 | 4/2014 | ............ B60R 25/00 |
| DE | 102013010250 A1 | 12/2014 | ............ H04W 76/02 |
| EP | 3086296 A2 | 10/1916 | ............ G07C 9/00 |
| EP | 3072317 B1 | 5/1918 | ............ H04L 29/08 |
| EP | 2381392 A1 | 10/2011 | ............ B60R 25/04 |
| EP | 1910134 B1 | 5/2013 | ............ B60R 16/02 |
| EP | 2860071 A1 | 4/2015 | ............ B60R 11/02 |
| JP | 2007132085 A | 5/2007 | ............ B60R 25/01 |
| JP | 2012151785 A | 8/2012 | ............ H04B 1/59 |
| WO | 2016/005013 A1 | 1/1916 | ............ H04M 1/60 |
| WO | 2018/233975 A1 | 12/1918 | ............ B60R 25/24 |
| WO | 2014/091654 A1 | 6/2014 | ............ H04M 1/725 |

OTHER PUBLICATIONS

International Search Report and Written Opinion, Application No. PCT/EP2018/063596, 9 pages, dated Aug. 29, 2018.

* cited by examiner

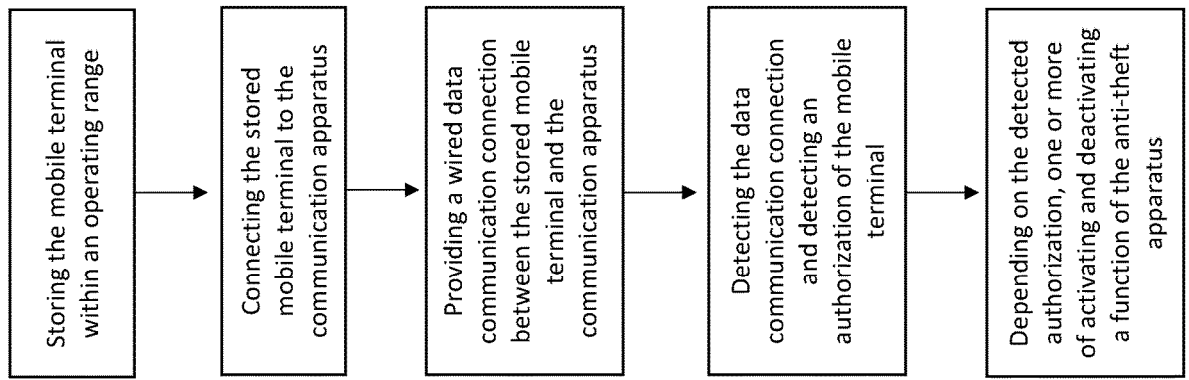
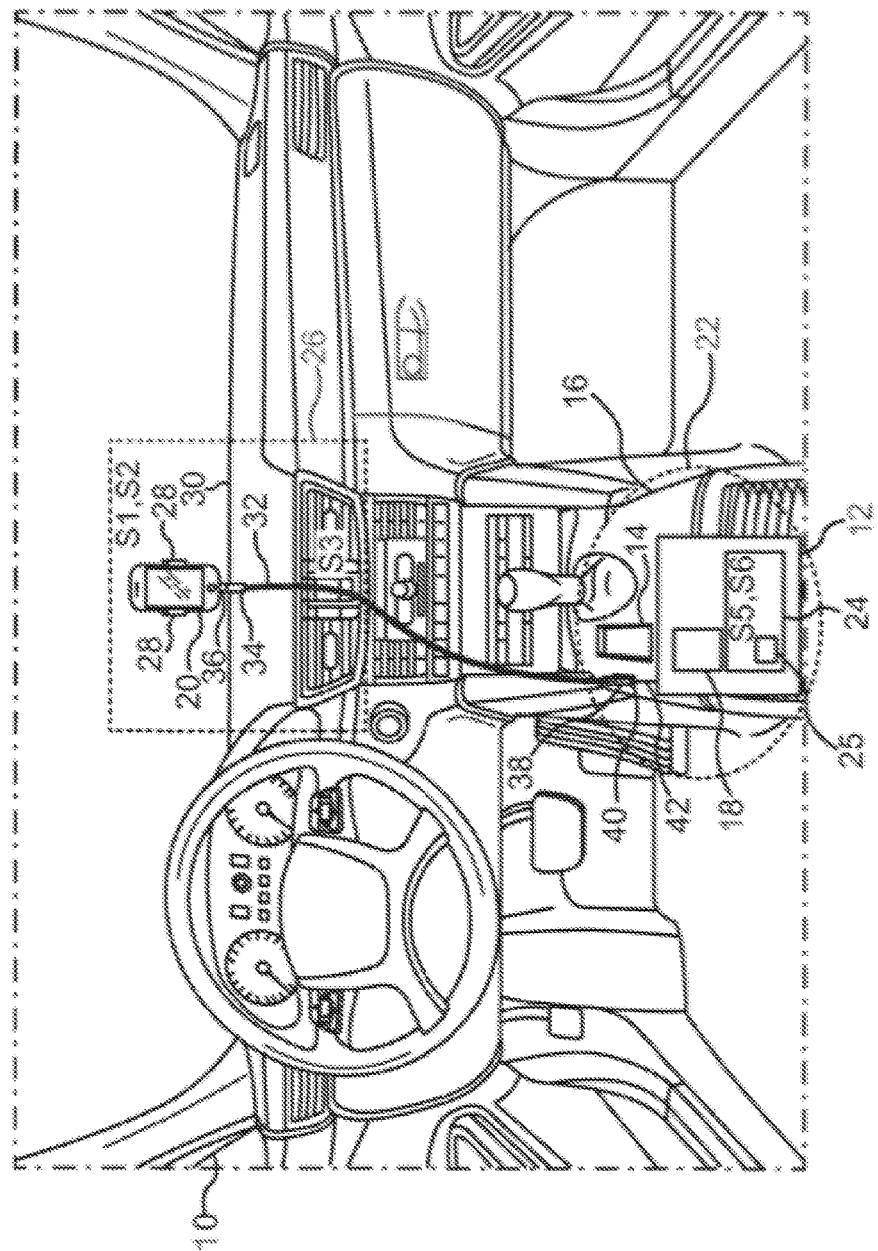

METHOD FOR OPERATING AN ANTI-THEFT APPARATUS OF A MOTOR VEHICLE, AND A MOTOR VEHICLE HAVING A MOBILE TERMINAL AS THE VEHICLE KEY

CROSS-REFERENCE TO RELATED APPLICATIONS

This application claims priority to German Patent Application No. DE 10 2017 210 568.2, filed on Jun. 22, 2017 with the German Patent and Trademark Office. The contents of the aforesaid Patent Application are incorporated herein for all purposes.

TECHNICAL FIELD

The invention relates to a method for operating an anti-theft apparatus of a motor vehicle with the assistance of a mobile terminal. An anti-theft apparatus is understood to be a device, a device component or a system of the motor vehicle that provides one or more functions for releasing or blocking the use of the motor vehicle, and can comprise, for example, an immobilizer, and/or an alarm system, and/or a control of the locking system, for example to unlock or lock a motor vehicle door or a motor vehicle window. The mobile terminal can for example be a smartphone or tablet computer.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

When using smartphones as a vehicle key, a smartphone, for example, can also be used to deactivate or activate an immobilizer upon starting the engine in addition to enabling access to the vehicle. In this regard, it is necessary that the smartphone used as a vehicle key must be positioned in a specific location in the vehicle before starting the engine. To accomplish this, a charging cradle is commonly provided in a center console. On the one hand, this is to ensure that the smartphone is located in the vehicle when starting the engine and, on the other hand, that communication can occur between the immobilizer in the vehicle and the smartphone used as a vehicle key, said communication normally being configured by a near field communication connection (NFC), or other radio path with a short radio range.

The use of the smartphone in the vehicle is restricted by the necessity of placing the smartphone for example in the charging cradle on the center console. A user of the motor vehicle frequently desires to use the smartphone while driving, for example as a navigation device, to play back music or to telephone using a hands-free function and, in order to do this, to attach it with a holding device or holding apparatus, for example to the dashboard or the front windshield in a user-friendly position. In this position, however, the communication regarding immobilization cannot occur, meaning that the smartphone must repeatedly be removed from the holding device when the engine is to be started.

This is particularly uncomfortable since communication between the immobilizer and smartphone is also normally necessary while driving, for example if the windows are to be opened, or in conjunction with an engine start/stop system. Furthermore, a mobile terminal in the center console does not normally have any GPS reception, which is why a navigation function of the mobile terminal can only be used to a very restricted extent while driving. Even with good reception, the driver would, however, have to direct his view to the center console, for example in order to see navigation instructions on a screen of the mobile terminal.

EP 1 910 134 B1 describes an identification and/or locking system for identifying and/or releasing a technical system with the assistance of a smartphone. An example of a function can be a locking of the lock, or a release or locking of a steering lock.

DE 602 25 772 T2 describes a security system for a construction machine, wherein a personal ID number is read out by the cell phone.

A system and a method for a vehicle function activated by a mobile device is known from DE 10 2013 222 332 B4, wherein an authentication between a vehicle and a device with an embedded computer processor takes place with the assistance of radio signals.

Finally, DE 10 2016 106 057 A1 describes a vehicle system with a user interface for programming a wireless radio key.

DE 10 2011 011 697 A1 describes a locking system for a vehicle with a receiving apparatus that can be fixedly integrated in the vehicle for receiving authorization data, a provision apparatus for providing the authorization data, and a control apparatus that is connected to the receiving apparatus to control access authorization and/or driving authorization for the vehicle.

DE 10 2013 221 116 A1 describes an onboard vehicle system, a vehicle control method, and a vehicle control system, and in particular an onboard vehicle system, a vehicle control method and a vehicle control system that make it possible to perform an operating process such as starting a vehicle, and/or locking/unlocking a door of the vehicle using a portable universal terminal.

SUMMARY

The prior art describes either the use of the radio key or a mobile terminal from outside the motor vehicle and thus does not address the problem of their use while driving, or describes the aforementioned radio communication that can only occur within a very short transmission and reception range of near field communication. The aforementioned problems are therefore not solved by the prior art.

An object of the invention is to increase driving safety while driving and improve the comfort of use.

The object is solved by the method and the device in accordance with the independent claims. Embodiments are discussed in the dependent claims and the following description.

The details of one or more embodiments are set forth in the accompanying drawings and the description below. Other features will be apparent from the description, drawings, and from the claims.

BRIEF DESORPTION OF THE DRAWINGS

The single FIG. 1 illustrates the principle of the method on the basis of an exemplary embodiment.

DESCRIPTION

A first aspect is based on the concept of storing the mobile terminal, e.g., with the assistance of a holding apparatus, within an operating range, wherein the operating range is a range that is easily accessible by the user while driving, and wherein the operating range lies outside of a transmission and reception range of a communication apparatus of an anti-theft apparatus. In other words, the mobile terminal is not stored in the exemplary tray in the center console while driving, but rather outside of the transmission and reception range for the communication apparatus of the anti-theft apparatus, for example in a holding device on the windshield, or for example in the hand of the passenger. The communication between the mobile terminal and the communication apparatus of the anti-theft apparatus takes place via a connecting device for connecting the mobile terminal and the communication apparatus, such as, e.g., for exchanging data between the mobile terminal and the communication apparatus.

A communication apparatus is understood to be a device or device component of an anti-theft device for transmitting and/or receiving signals that, inter alia, is configured in this case to authenticate a mobile terminal serving as a vehicle key, inter alia via a radio path with a range restricted to the vehicle interior. With the method according to the first aspect and a motor vehicle according to a second aspect, the mobile terminal can be simultaneously employed with improved usage comfort for example as a navigation device or music playback device and stored in a practical position for the user so that he does not have to look at the center console while driving in order to see the screen of the mobile terminal. At the same time as using the additional function, i.e., usage as for example a navigation device, the mobile terminal still fulfills its function in communicating with the anti-theft apparatus so that, for example, all of the functions of the anti-theft apparatus can also be controlled and used while driving, and so that no error messages that there is no vehicle key in the motor vehicle are output by the anti-theft apparatus while driving. This distracts the driver less which significantly increases driving safety.

The method according to the present aspect for operating an anti-theft apparatus of a motor vehicle with the assistance of a mobile terminal may have the following steps. The anti-theft apparatus has a communication apparatus for near field communication and a storage device for storing a mobile terminal, wherein the storage device is fixedly arranged within a transmission and reception range of the communication apparatus on a first element of interior equipment of the motor vehicle.

The mobile terminal is stored within an operating range in an interior of the motor vehicle, the operating range being located outside the transmission and reception range.

By means of a connecting device, i.e., a component for physically connecting the mobile terminal to the communication apparatus, the stored mobile terminal is connected to the communication apparatus by fastening a first connecting element of the connecting apparatus to the mobile terminal, and fastening another connecting element of the connecting device to the anti-theft apparatus. The fastening is for example a connection of the respective connecting element to the mobile terminal or anti-theft apparatus, wherein this connection can be disconnected again nondestructively.

This connection provides a wired data communication connection between the stored mobile terminal and the communication device by means of the connecting apparatus. In other words, the connecting device can also be designated as a wired data communication connection, and the connecting apparatus may for example be designed as a cable.

By means of a control apparatus, the data communication connection provided by the connecting device is detected between the mobile terminal, and an authorization of the mobile terminal to operate the anti-theft apparatus is detected. For example, when the authorization is being detected by the control apparatus, there can be an authentication of the mobile terminal by, for example, querying an access code saved digitally in the mobile terminal. Depending on the detected authorization, there is an activation and/or deactivation of a function of the anti-theft apparatus.

In other words, it is detected whether the mobile terminal is located within the motor vehicle when the mobile terminal is connected to the anti-theft apparatus via the connecting apparatus, and whether data is being exchanged with the anti-theft apparatus via this connecting apparatus. If it is detected that the mobile terminal is located within the motor vehicle, the function of the anti-theft apparatus is activated and/or deactivated, i.e., the anti-theft apparatus is operated while the mobile terminal is located outside of the transmission and reception range and within the operating range.

A control apparatus is understood to be a device or a device component that is designed and configured to process and generate control signals and, for example, can be designed as a control board, or control chip, or control device. The control apparatus can be a component of the motor vehicle, and/or the mobile terminal, and/or the anti-theft apparatus.

This results in the benefits indicated above. Another benefit of the motor vehicle according to the second aspect and the method of the first aspect is that the user of the motor vehicle can freely select the attachment site for the mobile terminal. Another benefit is that the user of the motor vehicle can freely select the attachment site for the mobile terminal. Although, for example, a search for or query of the mobile terminal by means of near field communication can result in the mobile terminal not being in the transmission and reception range, it can nonetheless be detected that the mobile terminal is located within the motor vehicle, and the functions of the anti-theft apparatus can still be performed, and potential error messages can be reduced or avoided. The motor vehicle therefore does not have to be retrofitted with alternative or additional communication apparatuses to, for example, bridge longer radio paths.

In some embodiments of the method according to the first aspect, the wired connecting device may also be used to charge the energy store of the mobile device from a power source apparatus in addition to transmitting data.

A power source apparatus is understood to be a device or a component for supplying a terminal with energy, such as a battery or a power circuit, or a charge coil, or a power connection of the motor vehicle. The charging process can, for example, be initiated by connecting the mobile terminal to the connecting device, or by a sensor signal from the mobile terminal, or a sensor in the connecting device, or a holding device, or in the power source apparatus.

In some embodiments, the successful connection of the mobile terminal in the interior may be detected by detecting an active data exchange between the mobile terminal and the anti-theft apparatus to authenticate the mobile terminal via the connecting apparatus. Because of that, the method may be configured to be very efficient.

In some embodiments, a holding apparatus for storing the mobile terminal may be provided, wherein a holding apparatus is understood to be a device for holding or storing the mobile terminal, or a region of a component on which or with which the mobile terminal can be stored. This allows the mobile terminal to be fixed within the operating range.

The aforementioned object is also solved by a motor vehicle according to the second aspect that for example may be designed as an automobile, for example as a passenger car. The motor vehicle has an anti-theft apparatus which has a communication apparatus for near field communication with a mobile terminal and a storage device for storing a mobile terminal, wherein the storage device is fixedly arranged within a transmission and reception range of the communication apparatus on a first element of interior equipment of the motor vehicle, for example on a center console.

The motor vehicle according to this aspect comprises, a control apparatus, e.g., a control apparatus of the anti-theft apparatus, wherein the control apparatus is configured to perform the method steps relating to a control apparatus of an embodiment of the method according to the first aspect, for example in order to control, evaluate and/or monitor one of the embodiments. In this regard, the control apparatus may optionally have a processor apparatus, wherein the processor apparatus for example may have at least one microprocessor and/or at least one microcontroller. This results in the benefits indicated above.

According to an embodiment of the motor vehicle according to the second aspect, the motor vehicle has a connecting device for connecting the mobile terminal to the communication apparatus, wherein the connecting device is designed for wired data communication between the mobile terminal and the communication apparatus. This results in the benefits already indicated above. In addition, it results in the benefit for the user of the motor vehicle that no additional electronics have to be installed in an optional holding apparatus, and/or in another element of interior equipment. The connecting device, that may be designed as a cable, accordingly also mechanically ensures that the mobile terminal is located in the motor vehicle and does not have to be passed to another person, for example by the user through an open window.

The motor vehicle may optionally have a holding apparatus for storing the mobile terminal within an operating range in the interior of the motor vehicle, wherein the operating range is located outside the transmission and reception range. The holding apparatus may be designed as a storage surface of another element of interior equipment, or for example as a holder for the mobile terminal. This results in the benefits indicated above. If the holding apparatus is arranged in the operating range, a simple, space-saving component may be used as the holding apparatus.

According to some embodiments, the holding apparatus may have a stationary storage surface of a second element of interior equipment arranged outside of the transmission and reception range, for example a storage surface of a dashboard, and/or a stationary holder arranged outside of the transmission and reception range. These are particularly practical embodiments of the holding apparatus by means of which the mobile terminal may be positioned so as to be readily accessible for the user.

According to an embodiment of the motor vehicle, the connecting device may be designed as a cable. Such a connecting device mechanically ensures that the mobile terminal is located within the motor vehicle and for example cannot be passed to another person through an open window. Frequently, the user has already received such a connecting device designed in this manner upon buying the mobile terminal, and an additional connecting device is unnecessary.

In the following, other exemplary embodiments are described in detail and with reference to the FIGURE.

In the exemplary embodiments, the described components of the embodiment each represent individual features of the invention that should be considered independent of each other and should therefore be considered as a part of the invention both individually, in the shown combination, and in other combinations than that shown. In addition, the described embodiments can also be supplemented by further features of the invention, which have been described in the preceding.

Elements having the same functions are, in each case, provided with the same reference numbers in the FIGURE.

In this regard, the FIGURE shows a motor vehicle 10 that for example can be designed as a passenger car, or alternatively for example as a motorcycle or commercial vehicle. The motor vehicle 10 has an anti-theft apparatus 12 which for example can be part of an onboard computer or a driver assistance system and for example can comprise the following functions: an immobilizer; and/or opening and/or closing a window of the motor vehicle 10 and/or a motor vehicle door; and/or locking and/or unlocking a motor vehicle door; and/or an engine start function and/or an engine start/stop system.

In the example in the FIGURE, the anti-theft apparatus 12 can have a storage device 14 that may, e.g., be arranged in a center console 16 of the motor vehicle 10. The storage device 14 can for example be designed as a net or storage tray in an armrest in the center console 16. The anti-theft apparatus 12 has a communication apparatus 18 which is designed and configured for communicating with a mobile terminal 20 and in this regard may, e.g., have technology for near field communication known to a person skilled in the art. The transmission and reception range 22 in which near field communication can occur is identified in the FIGURE as an oval region delimited by a dashed line. The storage device 14 lies within this transmission and reception range 22. For example, the communication apparatus 18 can be designed and configured for data communication via for example a Bluetooth connection with a limited range, or as a near field radio connection (NFC). The transmission and reception range 22 can then for example lie within a radius of a few centimeters to, for example, 30 cm around the communication apparatus 18.

An antenna connection of the anti-theft apparatus 12 for telephony may for example also be arranged in the center console and coupled to the outside. The anti-theft apparatus 12 can optionally have a charge coil as a power source apparatus for charging the mobile terminal 20.

The motor vehicle 10 has a control apparatus 24 that may be designed as a control board or as a control chip. For example, the control apparatus 24 may be a component of the anti-theft apparatus 12. The control apparatus 24 may optionally have a processor apparatus 25 that for example may have a plurality of microprocessors. In an optional storage apparatus (not shown in the FIGURE), i.e., in a storage medium that for example may be a storage apparatus of the processor apparatus 25 or of the anti-theft apparatus 12, a program code may be saved that can execute an embodiment of the method according to the present aspect by being run by the processor apparatus 25. The exemplary program code may for example be a user program (app). Alternatively, for example in the FIGURE, the control apparatus 24 may for example be arranged in the mobile terminal 20 and for example additionally have the storage apparatus with the program code.

The FIGURE also shows an operating range 26 that may, e.g., lie between a driver of the motor vehicle and a windshield of the motor vehicle 10. The operating range 26 is shown in the FIGURE as a dashed rectangle. The operating range 26 lies outside of the transmission and reception range 22 and is therefore more readily accessible for the driver of the motor vehicle 10 and, when the mobile terminal 20, that for example can be designed as a smartphone or tablet computer, is being operated, the driver does not have to divert his sight from the driving activity. In the example in the FIGURE, the mobile terminal 20 can already be arranged within the operating range 26 with the assistance of the optional holding apparatus 28. In the example in the FIGURE, the holding apparatus 28 can comprise a holder for the mobile terminal 20 that for example can be fastened to the windshield, and in which the mobile terminal 20 can for example be locked or clamped. The mobile terminal 20 can therefore be stored within the operating range 26. Alternatively, the holding apparatus 28 may for example be designed as a storage surface or a storage pad on a dashboard 30.

A user of the motor vehicle 10, such as a driver of the motor vehicle 10, can for example be on a drive, or be preparing for a drive. For example, to release the immobilizer or initiate the engine start, he would have to place his mobile terminal 20 in the storage device 14 in the center console 16 so that the mobile terminal 20 is located within the transmission and reception range 22, i.e., within the near field communication range, so that the user can be authenticated and the immobilizer can be released by means of the mobile terminal 20 according to a method known to a person skilled in the art. However, the driver may wish to use the mobile terminal 20 as a navigation device, for example. So that he can look at a navigation map shown on a screen of the mobile terminal and does not have to divert his sight from the driving activity and look at the center console 16, the mobile terminal is stored in the holding apparatus 28, the exemplary holder. Another benefit of storing the mobile terminal 20 within the operating range 26 is that the mobile terminal 20 has better reception for a GPS signal, for example, or is able to receive such a signal at all, while positioning in the storage device 14 in the center console 16 may in certain circumstances lead to a loss of the GPS signal.

A connecting device 32 is provided, that for example may be designed as a cable, to reduce or prevent undesirable error messages from the anti-theft apparatus 12 while driving, that for example can be displayed on a screen of an instrument cluster or an infotainment system, if the anti-theft apparatus 12 detects while driving that the mobile terminal 20 is not located within the transmission and reception range.

This may circumvent the driver having to remove the mobile terminal 20 from the holding apparatus 28 and for example briefly place it in the storage device 14 while driving, for example to deactivate the exemplary error message of the mobile terminal 20.

The connecting device 32 can have a first connecting element 34 that for example can be plugged into a corresponding socket of the mobile terminal 20. The first connecting element 34 can be designed as an interface known to a person skilled in the art for a corresponding socket 36 of the mobile terminal 20. The exemplary connecting device 32 in the FIGURE can have another connecting element 38 that for example can be designed as a plug for an exemplary socket 40 of the anti-theft apparatus 12. In other words, the connecting device 32 may, e.g., be designed as a cable for data communication between the mobile terminal 20 with the anti-theft apparatus 12 and have an appropriate connecting element 34, 38 for both components. The FIGURE shows the data communication connection 42 of the anti-theft apparatus 12 that can connect the exemplary socket 40 to the communication apparatus 18.

Alternatively, the socket 40 can for example be a power connection of the motor vehicle 10, and the connecting element 38 can for example be designed as a USB plug or a USB adapter for e.g. a 12 V plug-in socket.

In a first optional method step S1, the holder apparatus 28 can be provided for storing the mobile terminal 20. The mobile terminal is stored in method step S2. By for example plugging in the connecting device 32, the mobile terminal 20 is spatially connected to the communication apparatus 18, i.e., the connecting device 32 is fastened to the mobile terminal 20 and the communication apparatus 18. In the example in the FIGURE, this provides the wired data communication connection between the mobile terminal 20 and the communication apparatus 18 (S4). In method step S5, the control apparatus 24 detects the provided data communication connection and can thereby detect the authorization of the mobile terminal (20). For example, the control apparatus 24 can query whether the mobile terminal 20 of the communication apparatus 18 is connected via the wired data communication connection of the connecting device 32.

Alternatively or in addition, it can be detected via a so-called mirror link function with the assistance of an interface of the mobile terminal 20, for example, to an infotainment system of the motor vehicle 10, that a screen image of the mobile terminal 20 can be mirrored on a screen of the infotainment system. In another variation, the motor vehicle 10 can have a sensor apparatus, such as a camera, on a roof liner that for example can film the operating range 26, and when the mobile terminal 20 in the holding apparatus 28 is recognized, can, with the assistance for example of image analysis software that for example can perform pattern recognition, evaluate a camera image and detect that the mobile terminal 20 can be seen in the holding apparatus 28 in the image. By using such image recognition, it can then be detected that the mobile terminal 20 may be located within the motor vehicle 10 (S5). In another variation, a radio connection to the center console 16 can be established, for example.

The control apparatus 24 can then for example detect that a mobile terminal 20 connected with the assistance of the connecting device has, for example, an access code that can describe an authorization for the immobilizer, and/or for example for starting the engine. If the authorization exists, the exemplary function, such as an engine start or an opening of a window, can be performed (S6).

Overall, the exemplary embodiments describe how a mobile terminal 20, for example a smartphone, can reliably and comfortably be used as a vehicle key.

According to another exemplary embodiment that can be described with reference to the FIGURE, the exemplary mobile terminal 20 can be designed as a smartphone and for example possess a charging connection and/or a data interface that are generally contacted simultaneously in a plug-in connection, for example a USB interface and/or a data interface.

To use the mobile terminal 20 for example as a navigation device or a music player in the holding apparatus 28, for example in a holder, the exemplary smartphone can be connected to the motor vehicle 10 (S3) by the connecting device 32, for example a data cable. In this case, authentication communication may, e.g., occur in this exemplary cable connection between an exemplary immobilizer in the motor vehicle 10 and the exemplary smartphone. This can ensure that the mobile terminal 20 is located within the motor vehicle 10, wherein the exemplary smartphone can for example be securely connected in the interior by the exemplary cable to a vehicle socket as the connecting element 38, and communication for deactivating the immobilizer can occur not only at the predetermined storage site, the storage device 14, but also at a position determined by the user, for example within the operating range 26. The method can provide that after the mobile terminal 20 used as the vehicle key is not found at the predetermined storage site, it can be checked (S5) whether the mobile terminal 20 is connected by the connecting device 32 to the motor vehicle 10, and if this is the case, the exemplary communication regarding immobilization can be carried out by this connecting device 32, the exemplary cable.

Due to the arrangement as discussed, the mobile terminal can be used without the described restrictions on use while driving, for example as a navigation device or music player in the exemplary holder, for example on the dashboard. In other words, the restrictions on use associated with the storage site that previously has been fixedly specified in the storage device 14 can be eliminated.

According to another exemplary embodiment, the predetermined storage site, the storage device 14, for the exemplary smartphone as the mobile terminal 20 can be a convenient position for using the mobile terminal 20 as, for example, a navigation device. For example, the predetermined storage site can be located within the operating range 26. In other words, the storage device 14, and optionally the components of the anti-theft apparatus 12, can be installed in the exemplary dashboard 30. However, a predetermined position, for example on the dashboard 30 also requires a holding apparatus 28 onboard the vehicle provided by the manufacturer that simultaneously allows the mobile terminal 20 to be read and operated by the user of the motor vehicle, the exemplary driver.

According to another exemplary embodiment, the exemplary holder can contain an additional communication apparatus for using the mobile terminal 20 while driving (not shown in the FIGURE) by means of which the exemplary function of the immobilizer can be communicated, for example to deactivate the immobilizer. To accomplish this, a radio transmitter could for example be provided in the holding apparatus 28.

REFERENCE NUMBER LIST

10 Motor vehicle
12 Anti-theft apparatus
14 Storage device
16 Center console
18 Communication apparatus
20 Mobile terminal
22 Transmission and reception range
24 Control apparatus
25 Processor apparatus
26 Operating range
28 Holding apparatus
30 Dashboard
32 Connecting device
34 First connecting element
36 Socket
38 Second connecting element
40 Socket
42 Data communication connection
S1-S6 Method steps The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A motor vehicle, comprising:
an anti-theft apparatus, having a communication apparatus for near field communication and a storage device for storing a mobile terminal, wherein the storage device is fixedly arranged within a transmission and reception range of the communication apparatus on a first element of interior equipment of the motor vehicle; and a control apparatus, configured to perform at least the following method steps:
detecting a data communication connection, provided by a connecting device, between the mobile terminal and the communication apparatus;
detecting an authorization of the mobile terminal to operate the anti-theft apparatus; and
depending on the detected authorization, one or more of activating and deactivating a function of the anti-theft apparatus while the mobile terminal is located outside of the transmission and reception range.

2. The motor vehicle of claim 1, further comprising:
the connecting device for connecting the mobile terminal to the communication apparatus, wherein the connecting device is designed for wired data communication between the mobile terminal and the communication apparatus.

3. The motor vehicle of claim 2, wherein the first element of interior equipment is designed as a center console.

4. The motor vehicle of claim 2, further comprising:
a holding apparatus for storing the mobile terminal within an operating range of an interior, wherein the operating range is located outside the transmission and reception range.

5. The motor vehicle of claim 2, wherein the connecting device is designed as a cable.

6. The motor vehicle of claim 1, wherein the first element of interior equipment is designed as a center console.

7. The motor vehicle of claim 6, further comprising:
a holding apparatus for storing the mobile terminal within an operating range of an interior, wherein the operating range is located outside the transmission and reception range.

8. The motor vehicle of claim 6, wherein the connecting device is designed as a cable.

9. The motor vehicle of claim 1, further comprising:
a holding apparatus for storing the mobile terminal within an operating range of an interior, wherein the operating range is located outside the transmission and reception range.

10. The motor vehicle of claim 9, wherein the holding apparatus comprises a storage surface that is fixed and/or arranged outside of the transmission and reception range of a second element of interior equipment; and/or a holder that is fixed and/or arranged outside of the transmission and reception range.

11. The motor vehicle of claim 10, wherein the connecting device is designed as a cable.

12. The motor vehicle of claim 9, wherein the connecting device is designed as a cable.

13. The motor vehicle of claim 1, wherein the connecting device is designed as a cable.

14. A method for operating an anti-theft apparatus of a motor vehicle, the anti-theft apparatus having a communication apparatus for near field communication and a storage device for storing a mobile terminal, wherein the storage device is fixedly arranged within a transmission and reception range of the communication apparatus on a first element of interior equipment of the motor vehicle, the method having the steps:
  storing the mobile terminal within an operating range of an interior of the motor vehicle, wherein the operating range is located outside the transmission and reception range,
  using a connecting device:
  connecting the stored mobile terminal to the communication apparatus by fastening a first connecting element of the connecting device to the mobile terminal, and fastening a second connecting element to the anti-theft apparatus, and
  providing a wired data communication connection between the stored mobile terminal and the communication apparatus
  using a control apparatus:
  detecting the data communication connection provided by the connecting device between the mobile terminal, and detecting an authorization of the mobile terminal to operate the anti-theft apparatus; and
  depending on the detected authorization, using the control apparatus: one or more of activating and deactivating a function of the anti-theft apparatus while the mobile terminal is located outside of the transmission and reception range and within the operating range.

15. The method of claim 14, further comprising:
  detecting the successful connection of the mobile terminal in the interior by detecting an active data exchange between the mobile terminal and the anti-theft apparatus to authenticate the mobile terminal via the connecting apparatus.

16. The method of claim 14, further comprising:
  providing a holding apparatus for storing the mobile terminal.

17. The method of claim 15, further comprising:
  providing a holding apparatus for storing the mobile terminal.

18. A method for operating an anti-theft apparatus of a motor vehicle, the anti-theft apparatus having a communication apparatus for near field communication and a storage device for storing a mobile terminal, wherein the storage device is fixedly arranged within a transmission and reception range of the communication apparatus, the vehicle further comprising a connecting device, which is configured to provide a wired data communication connection between the mobile terminal and the communication apparatus, the method comprising at least the steps:
  detecting the data communication connection provided by the connecting device between the mobile terminal and the anti-theft apparatus;
  detecting an authorization of the mobile terminal to operate the anti-theft apparatus and/or the vehicle; and
  depending on the detected authorization, one or more of activating and deactivating a function of the anti-theft apparatus and/or the vehicle while the mobile terminal is located outside of the transmission and reception range.

* * * * *